May 5, 1953  R. O. S. SHOOK  2,637,575
KNEE GUARD OR BRACE
Filed April 30, 1951
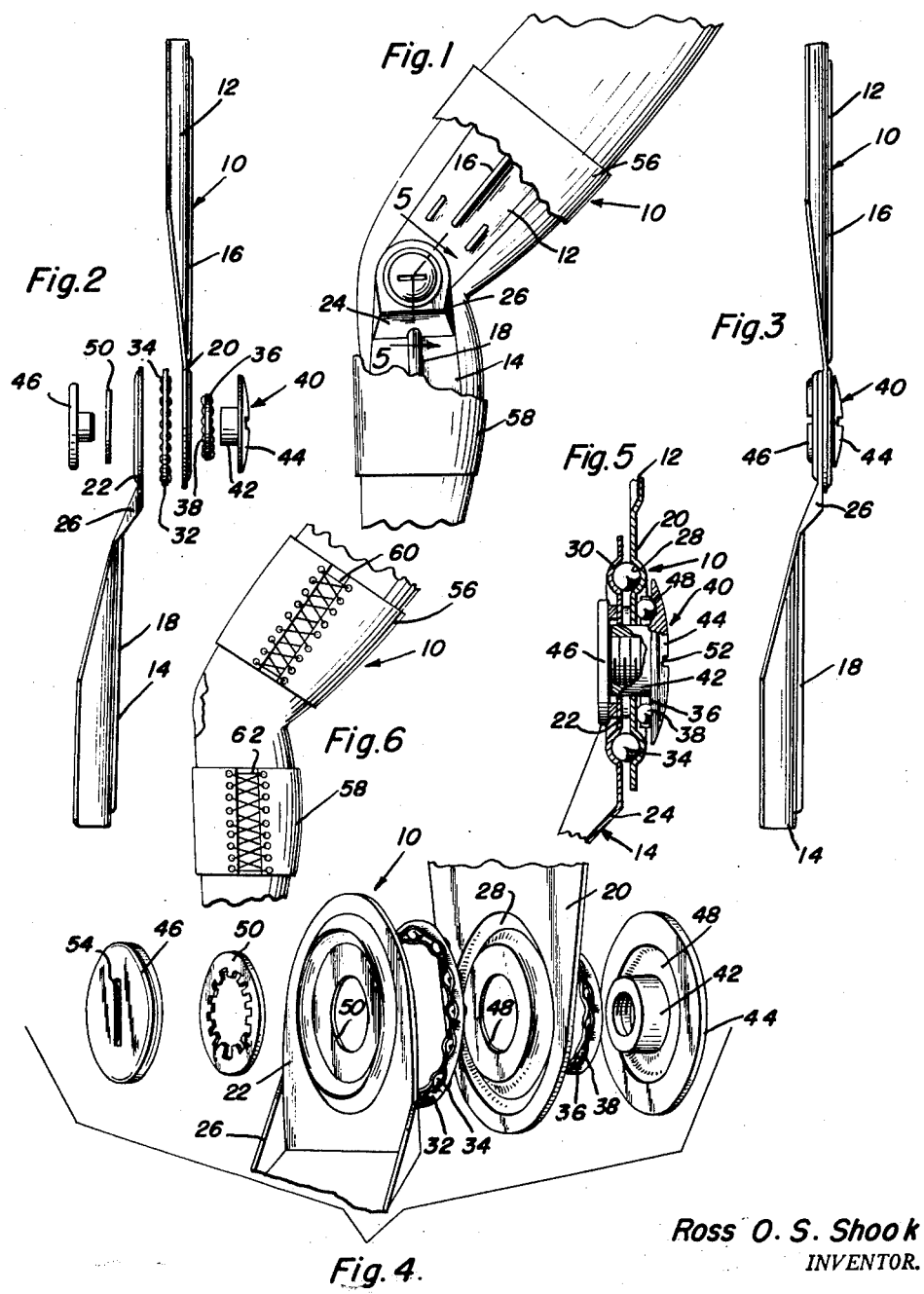
Ross O. S. Shook
INVENTOR.
BY
Attorneys Patented May 5, 1953

2,637,575

UNITED STATES PATENT OFFICE 2,637,575

KNEE GUARD OR BRACE

Ross O. S. Shook, Hutchinson, Kans.

Application April 30, 1951, Serial No. 223,724

2 Claims. (Cl. 287—101)

1

This invention comprises novel and useful improvements in knee braces and more particularly pertains to a brace for a knee joint.

An important object of this invention is to provide a brace for a knee joint which will permit free movement of the knee joint, while bracing the joint against lateral impact, and which brace is designed primarily for use on the side of the leg, adjacent the knee joint.

Another important object of this invention is to provide a knee brace, in accordance with the foregoing object, in which the plates of the knee brace are connected together by a bearing assembly, which assembly is of compact and simple construction, thereby rendering the brace particularly adapted for use on the inside of the leg.

An important feature of this invention resides in the provision of a pair of plates having end portions thereof in overlapping relation, which plates have annular press-formed bearing races in the overlapping end portions for receiving a first bearing assembly, a stud and sleeve coupling detachably connecting the plates together, with a second bearing assembly, of a relatively smaller diameter than the convex face of the press-formed races, disposed between one head of the stud and sleeve coupling and the adjacent plate.

Another feature of this invention resides in the provision of a knee brace, in accordance with the foregoing feature, in which that head of the stud and sleeve coupling which engages the second bearing assembly has a convex outer face which fairs into the outer portion of the convex face of the press-formed bearing race of the adjacent plate, and in which the other head of the stud and sleeve coupling is disposed within the confines of the convex face of the bearing race in the other of said plates.

These, together with various ancillary objects and features are attained by this device, a preferred embodiment of which has been illustrated in the accompanying drawings, wherein:

Figure 1 is a side elevational view of the knee brace arranged in operative position on one side of the user's leg;

Figure 2 is an assembly view of the knee brace;

Figure 3 is a front elevational view of the knee brace;

Figure 4 is an enlarged perspective assembly view of the knee brace bearing assembly;

Figure 5 is a longitudinal sectional of the knee brace bearing assembly, taken substantially on the plane 5—5 of Figure 1; and Figure 6 is a side elevational view of the knee brace, as viewed from the other side of the user's leg.

2

Reference is now made more specifically to the accompanying drawings wherein the knee brace, indicated generally by the numeral 10, is shown attached to the inside of the limbs of the user adjacent the knee joint.

The knee brace 10 includes upper and lower plates 12 and 14 respectively, which are transversely curved to fit the upper and lower limbs of the user, adjacent the knee joint. As is best shown in Figure 1, both the upper and lower plates may have one or more longitudinally extending reinforcing ribs 16 and 18, respectively, which ribs are preferably press-formed in the plates. The upper plate 12 has one end portion 20 thereof disposed in overlapping relation with one end portion 22 of the lower plate 14, the lower plate 14, as is best shown in Figures 3 and 5, including a laterally offset portion 24 whereby the longitudinal axis of the lower plate is disposed substantially parallel to, but laterally offset from the longitudinal axis of the upper plate. Suitable reinforcing gussets 26 are formed integrally with the laterally offset portion 24, and the adjacent end portion 22 of the lower plate, for obvious reasons.

The end portions 20 and 22 of the upper and lower plates respectively each have annular recesses 28 and 30 press-formed in the registering faces thereof, and thereby forming concavo-convex bearing races. A first anti-friction bearing assembly 32, which includes the balls 34 is disposed in the registering concave faces of the bearing races, a second relatively smaller bearing assembly 36, which includes the balls 38 being disposed concentrically of the first bearing assembly, and adjacent the outer face of the upper plate 12. As is best shown in Figure 5, the second bearing assembly is disposed within the confines of the convex face of the bearing race in the first plate 12, whereby the inner and outer faces of that plate form races for the first and second bearing assemblies, respectively.

A stud and sleeve coupling 40, which includes the internally threaded sleeve 42 and the integral cap 44, together with the headed stud 46 is provided for detachably securing the plates together. As is also best shown in Figure 5, the sleeve 42 extends through the aligned openings 48 and 50 in the end portions 20 and 22, which openings are concentric with the bearing races 28 and 20, with the cap 44 engaging the second bearing assembly 36. In order to render the assembly more compact, it is intended that the cap 44 have a concentric groove 48 in the face thereof which registers with the upper plate, and which groove provides a seat and bearing race for the second bearing assembly 36. Additionally, it is contemplated that the outer face of the cap 44 be convex, as is shown in Figures 3 and 5 with the periphery of the cap fairing into the outer portion of the convex face of the bearing race 28 in the upper plate 12 to afford a smooth contour.

The headed stud 46, which is threadedly received in the sleeve 42 is adapted to engage the end portion 22 of the lower plate, a suitable lock washer 50' being interposed between the head on the stud, and the end portion 22. As is clearly apparent from a consideration of Figure 5, the head on the stud 46 is so dimensioned so as to be receivable, in part, within the confines of the convex face of the bearing race, in the lower plate 14. Further, suitable slots or keyways 52 and 54 may be formed in the cap 44 and the headed stud 46, respectively, to facilitate tightening of the stud and sleeve coupling 40.

In order to attach the knee brace to the limbs of the wearer, there are provided flexible sleeves 56 and 58 which are adapted to be disposed about the limbs of the wearer, and secured thereto, as by lacings 60 and 62.

In assembling the knee brace, it is merely necessary to interpose the first bearing assembly between the end portions 20 and 22 of the upper and lower plates, respectively, so that the first bearing assembly will be seated in the braces 28 and 30. The second bearing assembly 36 is then disposed about the sleeve 42, and the sleeve then inserted through the aligned openings 48 and 50 in the end portions 20 and 22 respectively, the lock washer 50' then being disposed on the sleeve and the cap 46 secured to the sleeve 42, to retain the plates and bearings in their assembled position.

As it is believed that the manner of constructing the device will be readily apparent from the foregoing description, a more detailed description is deemed unnecessary. However, since numerous modifications will readily occur to those skilled in the art after a consideration of the foregoing specification and accompanying drawing, it is not intended to limit the invention to that shown and described, but all suitable modifications may be resorted to, falling within the scope of the appended claims.

Having described the invention, what is claimed as new is:

1. A limb brace comprising first and second plate members having end portions thereof disposed in overlapping relation, said end portions of said plate members having annular recesses depressed in the registering faces thereof and providing concavo-convex annular bearing races, a first anti-friction bearing assembly disposed in the registering recesses in said end portions, said end portions having axially aligned openings therein concentric of said races, an internally threaded sleeve, an enlarged cap on said sleeve, said sleeve extending through said aligned openings, a headed stud threadedly attached to said sleeve with the head having means engaging the end portion of the plate opposed to the end portion engaged by said cap, a second bearing assembly having a relatively smaller diameter than said first bearing assembly disposed on said sleeve between said cap and the adjacent end portion, said second bearing assembly being disposed within the confines of the convex face of the bearing race of the end portion against which it abuts, said cap having an annular groove therein in the face thereof which registers with the adjacent end portion, said second bearing assembly being seated in said groove, said cap having a convex face on the side thereof opposed to that which registers with the adjacent end portion of the plate, said convex face of the cap fairing into the outer portion of the convex face of the bearing race in said adjacent end portion.

2. A limb brace comprising first and second plate members having end portions thereof disposed in overlapping relation, said end portions of said plate members having annular recesses depressed in the registering faces thereof and providing concavo-convex annular bearing races, a first anti-friction bearing assembly disposed in the registering recesses in said end portions, said end portions having axially aligned openings therein concentric of said races, an internally threaded sleeve, an enlarged cap on said sleeve, said sleeve extending through said aligned openings, a headed stud threadedly attached to said sleeve with the head having means engaging the end portion of the plate opposed to the end portion engaged by said cap, a second bearing assembly having a relatively smaller diameter than said first bearing assembly disposed on said sleeve between said cap and the adjacent end portion, said second bearing assembly being disposed within the confines of the convex face of the bearing race of the end portion against which it abuts, said cap having an annular groove therein in the face thereof which registers with the adjacent end portion, said second bearing assembly being seated in said groove, said cap having a convex face on the side thereof opposed to that which registers with the adjacent end portion of the plate, said convex face of the cap fairing into the outer portion of the convex face of the bearing race in said adjacent end portion, the head on said stud being disposed within the confines of the other of said bearing races.

ROSS O. S. SHOOK.

References Cited in the file of this patent

UNITED STATES PATENTS

| Number | Name | Date |
| --- | --- | --- |
| 1,124,220 | Gaines et al. | Jan. 5, 1915 |
| 1,138,298 | Lang | May 4, 1915 |
| 1,703,264 | D'Albay | Feb. 26, 1929 |